(12) United States Patent
Barentine et al.

(10) Patent No.: US 11,256,078 B2
(45) Date of Patent: Feb. 22, 2022

(54) CONTINUOUS SCANNING FOR LOCALIZATION MICROSCOPY

(71) Applicant: Yale University, New Haven, CT (US)

(72) Inventors: Andrew Barentine, Cascade, CO (US); Joerg Bewersdorf, Guilford, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 17/067,875

(22) Filed: Oct. 12, 2020

(65) Prior Publication Data

US 2021/0109045 A1  Apr. 15, 2021

Related U.S. Application Data

(60) Provisional application No. 62/914,530, filed on Oct. 13, 2019.

(51) Int. Cl.
| | |
|---|---|
| *G02B 21/00* | (2006.01) |
| *G02B 6/42* | (2006.01) |
| *G02B 7/00* | (2021.01) |
| *G02B 17/00* | (2006.01) |
| *G02B 19/00* | (2006.01) |

(52) U.S. Cl.
CPC .................................. *G02B 21/002* (2013.01)

(58) Field of Classification Search
CPC .... G02B 21/002; G02B 21/00; G02B 6/4221; G02B 6/42; G02B 7/00; G02B 7/001; G02B 17/00; G02B 19/00
USPC ...................................................... 348/79, 61
See application file for complete search history.

(56) References Cited

U.S. PATENT DOCUMENTS

| | | | | |
|---|---|---|---|---|
| 7,630,113 | B2 * | 12/2009 | Sase ...................... | G02B 21/32 359/212.1 |
| 11,140,327 | B2 * | 10/2021 | Huang ............... | H04N 5/23212 |
| 2014/0267671 | A1 * | 9/2014 | Kenny .................. | G06T 3/0075 348/79 |

OTHER PUBLICATIONS

Barentine, A. E. S., et al., "Simultaneously Measuring Image Features and Resolution in Live-Cell STED Images", Biophysical Journal 115, Sep. 18, 2018, 951-956.

(Continued)

*Primary Examiner* — Daquan Zhao
(74) *Attorney, Agent, or Firm* — Saul Ewing Arnstein & Lehr LLP; Kathryn Doyle; Brian R. Landry

(57) ABSTRACT

One aspect of the invention provides a method of continuously scanning with a localization microscope. The method includes: modifying a position of a sample relative to a field of view (FOV) of the localization microscope to capture a plurality of image frames of the sample, each captured image frame having a limited FOV; acquiring image frames with the localization microscope during at least one position modification; determining a set of localization position coordinates for at least one localizable object in the sample within at least one image frame of the plurality of image frames; determining one or more field of view (FOV) position coordinates for the at least one image frame; and modifying the set of localization position coordinates based on the one or more FOV position coordinates to produce a collection of coordinates covering a larger spatial region than the at least one image frame.

23 Claims, 4 Drawing Sheets

(56) References Cited

OTHER PUBLICATIONS

Barentine, A. E. S., et al., "3D Multicolor Nanoscopy at 10,000 Cells a Day", http://dx.doi.org/10.1101/606954, Apr. 12, 2019, 12 pages.

Wikipedia, "Image stitching", https://en.wikipedia.org/wiki/Image_stitching, downloaded Jul. 31, 2019, 8 pages.

* cited by examiner

CONTINUOUS SCANNING FOR LOCALIZATION MICROSCOPY

CROSS-REFERENCE TO RELATED APPLICATION(S)

This application claims the benefit of priority to U.S. Provisional Patent Application Ser. No. 62/914,530, filed Oct. 13, 2019. The entire content of this application is hereby incorporated by reference herein.

STATEMENT REGARDING FEDERALLY SPONSORED RESEARCH OR DEVELOPMENT

This invention was made with government support under EB021232 awarded by the National Institutes of Health. The government has certain rights in the invention.

BACKGROUND OF THE INVENTION

Field of view (FOV) for fluorescence or localization microscopy images is commonly limited by camera size, camera bandwidth, illumination intensity, and/or illumination uniformity. In order to create a microscopy image having a larger FOV than the maximum FOV obtainable by the microscope, conventional techniques repeatedly image the sample then shift the FOV of the microscope in discrete steps. Then, during post-processing, the individual, neighboring image frames are stitched together to generate an image. This conventional technique generates artifacts that can degrade image quality. Correcting these artifacts computationally can decrease memory storage and processing capabilities for a microscopy imaging system, if accurate post-processing correction is possible.

SUMMARY OF THE INVENTION

One aspect of the invention provides a method a method of continuously scanning with a localization microscope. The method includes: modifying a position of a sample relative to a field of view (FOV) of the localization microscope to capture a plurality of image frames of the sample, each captured image frame having a limited FOV; acquiring image frames with the localization microscope during at least one position modification; determining a set of localization position coordinates for at least one localizable object in the sample within at least one image frame of the plurality of image frames; determining one or more field of view (FOV) position coordinates for the at least one image frame; and modifying the set of localization position coordinates based on the one or more FOV position coordinates to produce a collection of coordinates covering a larger spatial region than the at least one image frame.

This aspect of the invention can have a variety of embodiments. The method can further include generating a set of composite data or an image of the sample based on the collection of points. The image can be a single-molecule switching (SMS) image or a single-molecule localization microscopy (SMLM) image.

The method can further include identifying a time stamp for each of the plurality of frames, wherein determining the set of FOV position coordinates is based at least in part on the time stamps.

Modifying the lateral or axial position of the sample can further include continuous movement of the sample.

The method can further include: modifying a focal position of an objective lens of the localization microscope; and determining a set of focal position coordinates for each frame. The collection of points can be further based on the set of focal position coordinates for each frame.

The method can further include generating a three-dimensional image of the sample based on the collection of points.

Modifying the position of the sample relative to the localization microscope can include rotating the sample. Modifying the position of the sample relative to the localization microscope can include moving the localization microscope relative to the sample.

The method can further include illuminating the sample with one or more selected from the group consisting of: a spatially modulated light source, a temporally modulated light source, and short flashes of light to reduce blurring artifacts.

The localizable object can be a single molecule. The collection of coordinates can cover a spatial region at least 10 times larger than the FOV of at least one image frame.

Determining one or more field of view (FOV) position coordinates for the at least one image frame can further include localizing fiducial markers in the sample.

Determining one or more field of view (FOV) position coordinates for the at least one image frame can further include acquiring reference images of the sample.

Determining a set of localization position coordinates can account for motion-blur along a scanned direction. Determining a set of localization position coordinates can account for sub-frame position shifts due to rolling shutter of the camera.

At least one of the at least one localizable object in the sample can be within a plurality of the plurality of image frames. At least one of the at least one localizable object can have an intensity in each of a plurality of the plurality of image frames containing the at least one localizable object below an imaging threshold for the plurality of image frames.

A plurality of the plurality of image frames showing the same localizable object can be combined using known FOV coordinates of each frame before localizing the object. The plurality of the plurality of image frames can be combined by interpolation using piecewise-constant, linear, polynomial, spline, or other functions.

The localization microscope can be a super-resolution microscope.

Another aspect of the invention provides a non-transitory computer-readable medium containing program instructions executable by a processor. The computer-readable medium include program instructions to implement any of the methods described herein.

Another aspect of the invention provides a localization microscope for continuously scanning a sample. The localization microscope includes a controller programmed to perform the method of any of the methods described herein.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

Figure 1:
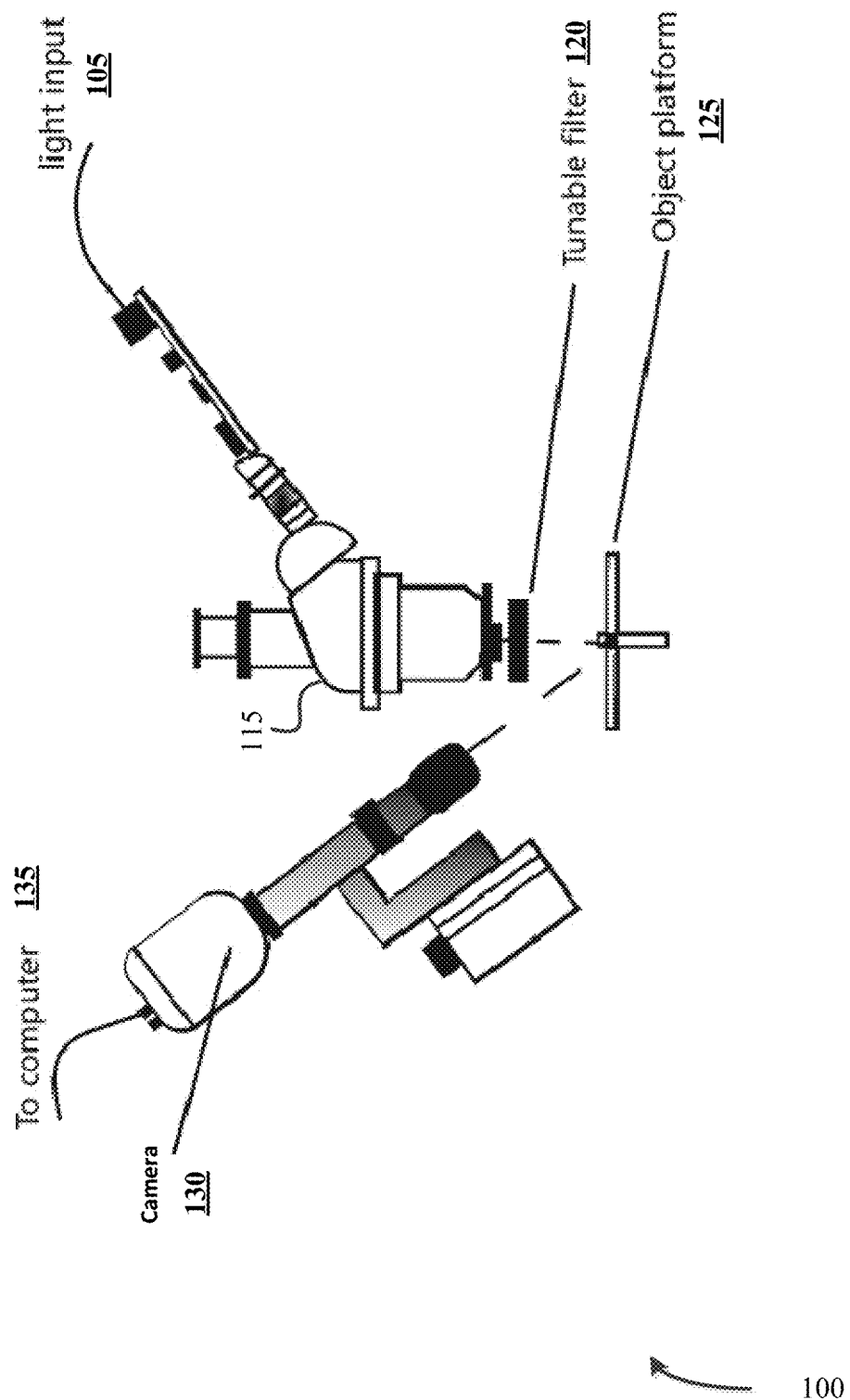
FIG. 1 illustrates a system for continuous scanning for localization microscopy, according to an embodiment of the claimed invention.

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Continuous Scanning Microscopy

The invention described herein provides continuous scanning of a sample to generate an image and mitigate limitations caused by the optical hardware included in the microscopy imaging system. The microscope can continuously scan a sample while capturing individual image frames as the object platform continuously repositions itself in relation to the microscope. The microscopy imaging system can identify localizations within an individual image frame (e.g., a molecule within the sample, etc.) and subsequently determine a set of position coordinates for the localization. The microscopy imaging system can also identify for an individual image frame a set of position coordinates at the time that the individual frame is captured. The microscopy imaging system can modify the position coordinates of the individual image frame based on the position coordinates of the localization (e.g., via combining the coordinates).

This modification can allow for moving the FOV of the microscopy imaging system while imaging a single, extended blinking movie of the sample. Thus, the FOV size and shape are not limited by the optical hardware of the microscopy system implemented, but rather by relative movement between the microscope and sample.

This continuous scanning can allow for artifact-free (e.g., free of linearity artifacts, etc.) imaging of large lateral FOVs, thereby allowing for the imaging of large samples. Additionally, continuous axial scanning can mitigate artifacts common to three-dimensional imaging of samples thicker than a micrometer. Continuous scanning the lateral FOV as well as the axial focus will provide a significant improvement in the quality, throughput, and sample-compatibility of localization microscopy.

Light Input

FIG. 1 provides an exemplary system 100 for continuous scanning for fluorescence microscopy according to embodiments of the claimed invention. System 100 includes light input 105. The light input can be a variety of light sources that can illuminate a sample or specimen on an object platform 125. Examples of light sources include laser light, LEDs, mercury-vapor light, xenon arc light, supercontinuum light, etc.

Although embodiments of the invention may be described in the context of fluorescence microscopy, the invention is applicable to a variety of microscopy techniques. For example, embodiments of the invention can be utilized in connection with emissions produced by e.g. bioluminescence, sonoluminescence, scattering-based vibrational imaging, and the like.

Microscope

A microscope 115 can be placed between the light input 105 and a tunable filter 120 of the system 100. The microscope 115 can be a conventional microscope as known in the art (e.g., a microscope capable of performing single molecule localization microscopy (SMLM), multiplexed error-robust fluorescence in situ hybridization (MERFISH), single molecule switching (SMS), total internal reflection fluorescence (TIRF), photoactivated localization microscopy (PALM), stochastic optical reconstruction microscopy (STORM), Point Accumulation for Imaging in Nanoscale Topography (PAINT), MINFLUX, and the like), where the microscope includes a dichroic mirror and an objective lens. The emitted light from the light source 105 can be received by the dichroic mirror of the microscope 115, pass through the body of the microscope 115, and be emitted through the objective lens towards a sample on the object platform 125.

Tunable Filter

A tunable filter 120 can be placed between the microscope 115 and the sample. The tunable filter 220 can be tuned to allow the emitted light from the microscope 115 to pass through while simultaneously filtering out surrounding or interfering light from reaching the object platform 125. This in turn can increase the accuracy of the system and reduce interfering light from reaching the receiver. Examples of the tunable filter can include, but are not limited to, an excitation filter, a liquid crystal tunable filter (LCTF), reflection off a digital micromirror device (DMD), and tunable bandpass filters.

Repositioning of the Object Platform

The object platform 125 can be positioned in relation to the body of the microscope 115. For example, the object platform 125 can be repositioned by an actuator, such as a motor-driven actuator (e.g., a servomotor). The actuator can reposition the object platform 125 laterally based on directions received from a computer or a wave-form generating device. Additionally or alternatively, the actuator can reposition the object platform 125 axially. Additionally or alternatively, an actuator can refocus the objective lens or tube lens of the microscope 115. Additionally or alternatively, the objective or tube lens focus can be otherwise modulated (e.g., an electrowetting variable focus and the like). Additionally or alternatively, an actuator can reposition the body of the microscope 115 in relation to the object platform 125.

Receiver

The receiver can include a receiver lens and a camera 130. In some cases, the camera 130 can be a charge coupled device (CCD), an electron multiplying CCD (EMCCD), complementary metal-oxide-semiconductor (CMOS), or a scientific complementary metal-oxide-semiconductor (sC-MOS) camera. The receiver lens can receive light emitted from the sample resting on the object platform 125 and pass the light to the camera 130. The camera 130 can capture an image frame emitted from the sample. For example, in fluorescence microscopy, the camera 130 captures the emitted fluorescence from the sample. For fluorescence microscopy, the receiver can be positioned, for example, at a variety of angles relative to the optical axis.

The camera 130 can capture image frames of the sample as the microscope and/or the object platform 125 is repositioned. The image frame capture time interval can be synchronous (e.g., every 1 millisecond) or asynchronous, and can be adjustable (e.g., via computer hardware).

Computer Hardware

The system 100 can also include computer hardware 135. The computer hardware 135 can control the actuator in repositioning the microscope 115, the object platform 125, the objective lens, or a combination thereof (e.g., via position modification component 205). In some cases, the computer hardware 135 can control the image frame capture time of the camera 130 (e.g., through control component 210).

In some cases, the computer hardware 135 can determine characteristics for captured image frames. For example, the computer hardware 135 can determine a time stamp for a captured image frame. The computer hardware 135 can log the time that an image frame was captured by the camera 130. Further, the computer hardware 135 can determine a position of the microscope 115 and/or the focal point of the objective lens in relation to the object platform 125 at the time the image frame is captured. In some cases, the camera on-board FPGA or processor can store the image frame time stamp, in which case the computer hardware can log other positions at the same time using a trigger from the camera.

Further, the computer hardware 135 can identify localizations within a captured image frame. A localization can be, for example, a molecule. In fluorescence microscopy, the molecule can emit fluorescent light, which can be captured in an image frame. A localization can be identified based on the captured fluorescence of the localization.

The computer hardware 135 can determine position coordinates of an identified localization within the captured image frame (e.g., through coordinate determination component 215). The position coordinates (e.g., x-, y-, and/or z-coordinates) of the localization can be identified based, in part, on the identified time that the image was captured.

The computer hardware 135 can also determine position coordinates for the FOV of the captured image frame (e.g., through coordinate determination component 215). Again, the position coordinates (e.g., x-, y-, and/or z-coordinates) of the FOV can be identified based, in part, on the identified time that the image was captured.

The computer hardware 135 can then modify the position coordinates of the FOV of the captured image frame based on the position coordinates of the localization(s) identified within the captured image frame (e.g., through coordinate modification component 220). For example, the position coordinates of the localization(s) can be added to the position coordinates of the FOV.

In some cases, the computer hardware 135 can then generate an image based on the modified position coordinates of the captured image frame (e.g., through generation component 225). The computer hardware 135 can "stitch" localizations together through the modified coordinates, rather than the conventional method of stitching neighboring FOV image frames. These stitched localizations can allow for artifact-free image generation, which can improve system processing, throughput, resource expenditure, etc.

Figure 2:
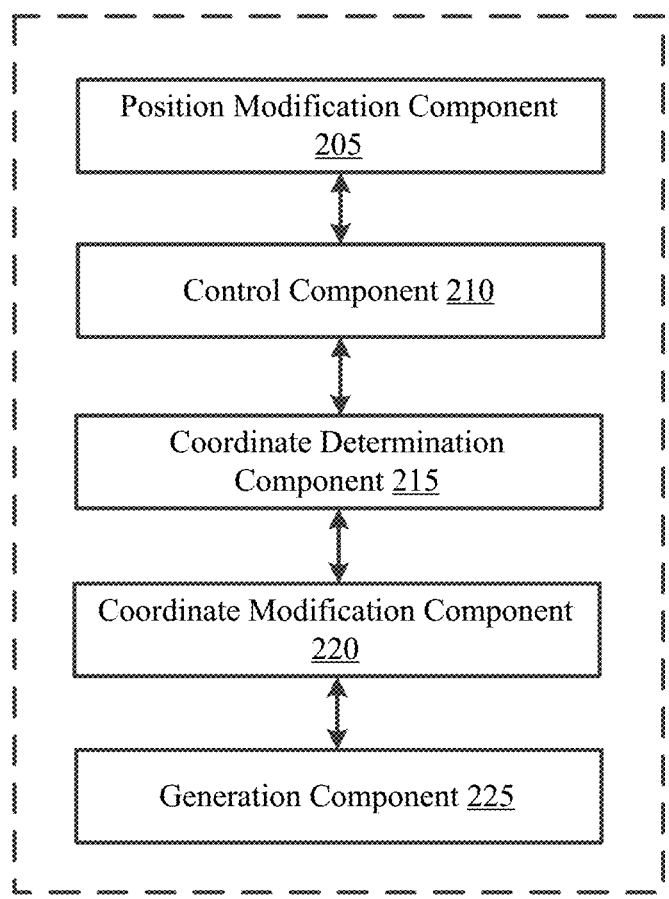
FIGS. 2 and 3 depict computer hardware for continuous scanning for localization microscopy, according to embodiments of the claimed invention.
Figure 3:
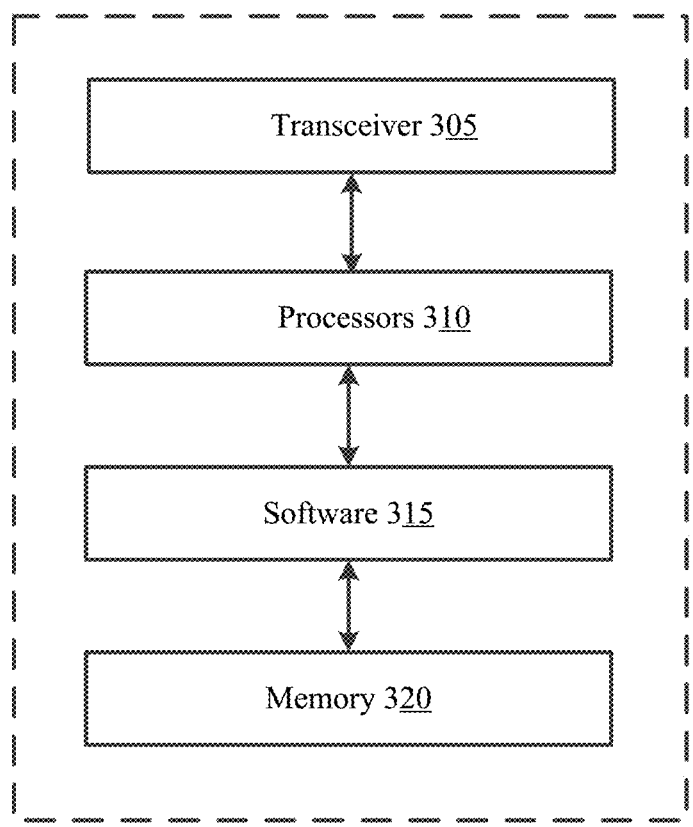

FIG. 3 depicts computer hardware 300 according to an embodiment of the claimed invention. The computer hardware 300 can be an example of the computer hardware 200 and/or computer hardware 135 according to FIGS. 2 and 1, respectively. The computer hardware can include a transceiver 305, processors 310, software 315, and memory 320.

Transceiver 305 can communicate with other entities of a system, such as the camera 130 and/or the microscope 115 of system 100 of FIG. 1.

Processors 310 can execute a set of functions (e.g., included in software 315) of the computer hardware 300. The processors 310 can execute a set of instructions to perform the functions of the position modification component 205, the control component 210, the coordinate determination component 215, the coordinate modification component 220, the generation component 225, the transceiver 305, or a combination thereof, as described in FIGS. 2 and 3.

Software 315 can include a set of instructions for performing various actions of the computer hardware 300. For example, software 315 can include a set of instructions, that when executed, can perform the functions of the position modification component 205, the control component 210, the coordinate determination component 215, the coordinate modification component 220, the generation component 225, the transceiver 305, or a combination thereof, as described in FIGS. 2 and 3.

Memory 320 can store captured image frames, such as from the camera 130 of FIG. 1, as well as processed or "stitched" images. Further, memory 320 can store software for performing the actions of the computer hardware 300, such as software 315. Further, the memory 320 can also store characteristics of captured images, such as time stamps, position coordinates, localization coordinates, etc. Additionally or alternatively, memory 320 can also include short-term memory such as random access memory (RAM), long-term memory such as read-only memory (ROM), or a combination thereof.

Exemplary Process Flow

Figure 4:
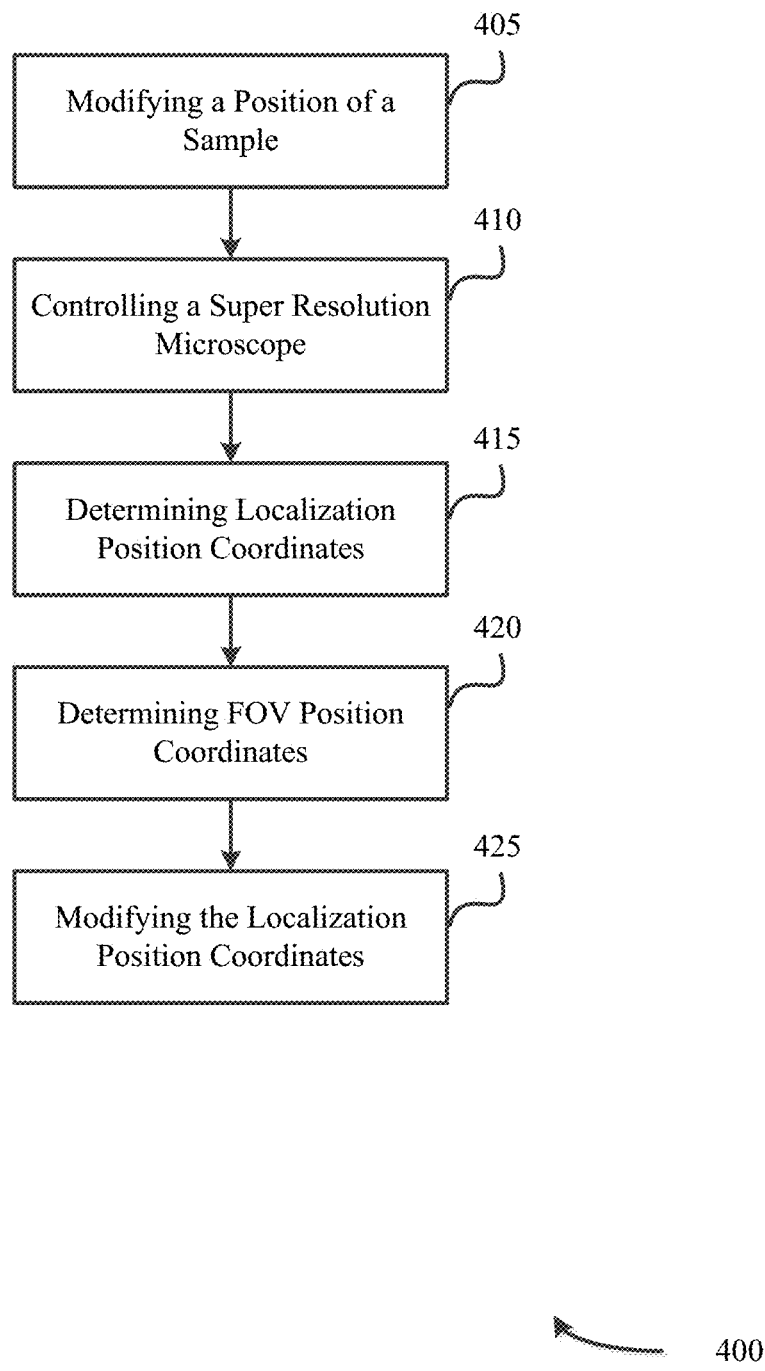
FIG. 4 depicts a process flow for continuous scanning for localization microscopy, according to an embodiment of the claimed invention.

An exemplary method of continuous scanning for fluorescence microscopy is depicted in the context of FIG. 4. The method 400 can be implemented by a system, such as system 100 as described with reference to FIG. 1.

In Step 405, a position of a sample relative to a localization microscope is modified to capture a plurality of images of the sample. Each captured image frame can include a limited FOV. For example, the object platform can be moved in relation to the microscope, the microscope can be moved in relation to the object platform, or a combination thereof. The modification can further be implemented by one or more actuators, which can be controlled by computer hardware (e.g., computer hardware 135, 200, and/or 300).

In Step 410, the localization microscope can be controlled during the position modification. For example, the super resolution microscope can be controlled (e.g., via computer hardware 135, 200, 300 etc.) to capture image frames while the microscope continuously scans the sample.

In Step 415, a set of localization position coordinates is determined for at least one localization within at least one image frame. For example, computer hardware can identify a localization within the image frame. In some cases, the localization can correspond to a molecule detected within the image frame. The computer hardware can determine position coordinates for the localization within the image frame.

In Step 420, one or more FOV position coordinates can be determined for the image frame. For example, the computer hardware (e.g., computer hardware 135, 200, 300, etc.) can identify a time that the image frame was captured. The computer hardware can then determine position coordinates for the image frame based on the time stamp (e.g., by identifying the position of the microscope and/or the object platform at the time stamp value).

At Step 425, the set of localization position coordinates can be modified based on the one or more FOV position coordinates to produce a collection of coordinates covering a larger spatial region than the at least one image frame. In some cases, the modification can include combining the set of localization position coordinates to the FOV position coordinates.

In some cases, a combination of Steps 415, 420, and 425 can be executed in parallel to repeated acquisition following Steps 405 and 410.

Example of Continuous Scanning in the Lateral Direction

A microscopy system can continuously scan in the lateral field during a recording of a blinking series for a single extended field of view (FOV) (e.g., rather than in discrete steps). The x and/or y coordinates of a captured image frame can be recorded (or interpolated from recordings at different sampling rates than the camera frame rate). The lateral coordinates of each raw blinking frame can then be combined onto the lateral coordinates of each single-molecule localization. This can effectively eliminate one edge of the FOV, such that an a×b lateral FOV is then a×|∞, which is limited only by the ability to scan (e.g., laterally).

Lateral scanning is often done using a translation stage that the sample sits on top of. Many of these stages have approximately 1 nanometer precision, which is smaller than the localization precision typical for each individual molecule. Thus, continuous lateral scanning would not come at the cost of image resolution.

Example of Continuous Scanning in the Axial Direction

The axial depth probed by three-dimensional localization microscopy modalities is typically less than a micrometer. Thus, in order to image an entire cell (e.g., typically 4 to 10 micrometers in thickness), raw blinking frames must be acquired with the focus at several different planes in the sample (e.g., the focus is 'z-stepped' through the sample). This can result in striping artifacts if not enough z-steps are taken, as the detection fidelity is usually higher near the focal plane than farther away. Striping can result in a non-linear imaging, which can be problematic for analysis. Striping can be alleviated by taking many z-steps, but this is time consuming and can additionally deteriorate the image quality for fluorescence microscopy modalities (e.g., STORM) because typical illumination schemes can bleach throughout the entire axial depth of the sample. These problems can be compounded if the sample is thicker (e.g., a tissue sample), as opposed to the thickness of an individual cell.

With continuous axial scanning, localizations can be merged from image frames acquired at different axial planes based on the determined z-position by a three-dimensional microscopy method (e.g., astigmatism, biplane, double-helix PSF, etc.) and the focal position of the objective lens as recorded by the system (e.g., via a piezo objective scanner, by reflecting a laser beam off of the coverslip at an angle, and the like) for each frame. The position of the objective lens can be determined at a much higher precision than the axial localization precision (e.g., approximately 1 nanometer compared to approximately 75 nanometers, respectively), and a focal position can be associated with each raw blinking frame, thereby associating each localization from that frame.

Exemplary Scenario

Provided below is an exemplary scenario depicting continuous scanning for localization microscopy, according to an embodiment of the claimed invention. The scenario depicted can be implemented by a microscopy system, such as system 100 of FIG. 1. Additionally or alternatively, the scenario depicted can be an example of process flow 400 of FIG. 4.

A biological tissue sample is placed on the object platform of the microscopy system. The tissue sample can be previously prepared for imaging by the microscopy system (e.g., the sample is injected with fluorophores for fluorescence microscopy).

The object platform can be repositioned in relation to the body of the microscope. For example, the object platform is moved left-to-right by an actuator. As the object platform moves, a camera captures images of the tissue sample (e.g., through emitted light from the tissue sample). For each captured image, the microscopy system can log a time value for each captured image (e.g., a time 0:00:43 for image frame 1, and a time of 0:00:45 for image frame 2).

Similarly, an axial focus of the object lens of the microscopy system can be altered or refocused by an actuator. The camera can capture image frames of the tissue sample as the object lens is refocused (e.g., via an actuator).

The microscopy system can also identify a localization within a captured image. For example, in image frame 1, the microscopy system detects a molecule in the sample from emitted fluorescence. The microscopy system determines a set of coordinates for the molecule within the FOV of image frame 1 (e.g., x-direction of +5 nm, y-direction of −3 nm, z-direction of +0 nm).

Further, the microscopy system can determine a set of FOV coordinates for image frame 1. The FOV coordinates can be based on the center or any other point of the FOV (e.g., x-direction of +1 nm, y-direction of +2 nm, z-direction of +3 nm). Further, the microscopy system can determine the FOV coordinates based on the logged time for when image frame 1 was captured (e.g., at a time value of 0:00:43, the coordinates for the center of the FOV for the system are: x-direction of +1 nm, y-direction of +1 nm, z-direction of +1 nm). Similarly, if the microscopy system is refocusing the objective lens, the microscopy system can also determine a focal point of the object lens and for a captured image frame based on a time stamp for when the image frame was captured.

The microscopy system can then modify the coordinates of the molecule by combining the molecule's coordinates with that of the FOV coordinates for image 1. For example, by adding the FOV coordinates to the molecule coordinates of the same axis (x, y, z), the resulting coordinates are: x-direction of +6 nm, y-direction of −2 nm, z-direction of +1 nm.

The microscopy system can then "stitch" localizations, modified using the FOV coordinates, from multiple frames together to generate an image. The image can be generated from the modified localizations using a variety of techniques including but not limited to 2D or 3D histogramming, Gaussian pointsprites, jittered triangulation, etc. The generated image can include a larger FOV compared to the FOV illuminated by the light source or captured by the camera (e.g., camera 130) on an individual frame. Further, the generated image can be generated without the byproduct of stitching artifacts or bleaching-related non-linearities, thereby saving processing and/or storage resources of the microscopy system.

Briefly, a Gaussian pointsprites method involves creating 2D or 3D grid that encompasses the range of x, y, (and, optionally, z) positions, then determine assign each localization to a "pixel", count the number of localizations for each pixel, and assign the intensity of that pixel to be the number of localizations assigned to it.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A method of continuously scanning with a localization microscope, the method comprising:
    modifying a position of a sample relative to a field of view (FOV) of the localization microscope to capture a plurality of image frames of the sample, each captured image frame having a limited FOV;
    acquiring image frames with the localization microscope during at least one position modification;
    determining a set of localization position coordinates for at least one localizable object in the sample within at least one image frame of the plurality of image frames;
    determining one or more field of view (FOV) position coordinates for the at least one image frame; and
    modifying the set of localization position coordinates based on the one or more FOV position coordinates to produce a collection of coordinates covering a larger spatial region than the at least one image frame.

2. The method of claim 1, further comprising:
    generating a set of composite data or an image of the sample based on the collection of points.

3. The method of claim 2, wherein the image is a single-molecule switching (SMS) image or a single-molecule localization microscopy (SMLM) image.

4. The method of claim 1, further comprising:
    identifying a time stamp for each of the plurality of frames, wherein determining the set of FOV position coordinates is based at least in part on the time stamps.

5. The method of claim 1, wherein modifying the lateral or axial position of the sample further comprises continuous movement of the sample.

6. The method of claim 1, further comprising:
    modifying a focal position of an objective lens of the localization microscope; and
    determining a set of focal position coordinates for each frame;
    wherein the collection of points are further based on the set of focal position coordinates for each frame.

7. The method of claim 6, further comprising:
    generating a three-dimensional image of the sample based on the collection of points.

8. The method of claim 1, wherein modifying the position of the sample relative to the localization microscope comprises rotating the sample.

9. The method of claim 1, wherein modifying the position of the sample relative to the localization microscope comprises moving the localization microscope relative to the sample.

10. The method of claim 1, further comprising:
    illuminating the sample with one or more selected from the group consisting of: a spatially modulated light source, a temporally modulated light source, and short flashes of light to reduce blurring artifacts.

11. The method of claim 1, wherein the localizable object is a single molecule.

12. The method of claim 1, wherein the collection of coordinates covers a spatial region at least 10 times larger than the FOV of at least one image frame.

13. The method of claim 1, wherein determining one or more field of view (FOV) position coordinates for the at least one image frame further comprises localizing fiducial markers in the sample.

14. The method of claim 1, wherein determining one or more field of view (FOV) position coordinates for the at least one image frame further comprises acquiring reference images of the sample.

15. The method of claim 1, wherein determining a set of localization position coordinates accounts for motion-blur along a scanned direction.

16. The method of claim 1, wherein determining a set of localization position coordinates accounts for sub-frame position shifts due to rolling shutter of the camera.

17. The method of claim 1, wherein at least one of the at least one localizable object in the sample is within a plurality of the plurality of image frames.

18. The method of claim 1, wherein at least one of the at least one localizable object has an intensity in each of a plurality of the plurality of image frames containing the at least one localizable object below an imaging threshold for the plurality of image frames.

19. The method of claim 1, wherein a plurality of the plurality of image frames showing the same localizable object are combined using known FOV coordinates of each frame before localizing the object.

20. The method of claim 19, wherein the plurality of the plurality of image frames are combined by interpolation using piecewise-constant, linear, polynomial, spline, or other functions.

21. The method of any one of claims 1-20, wherein the localization microscope is a super-resolution microscope.

22. A non-transitory computer-readable medium containing program instructions executable by a processor, the computer-readable medium comprising program instructions to implement the method of any of claims 1-20.

23. A localization microscope for continuously scanning a sample, the localization microscope comprising a controller programmed to perform the method of any of claims 1-20.

* * * * *